July 24, 1928. Re. 17,048

F. H. TUPPER

METHOD OF MAKING VENTILATING STRIPS FOR TRANSFORMERS

Original Filed April 18, 1922

INVENTOR
Frank H. Tupper
BY
Uberly & Barr
ATTORNEY

Reissued July 24, 1928. Re. 17,048

UNITED STATES PATENT OFFICE.

FRANK H. TUPPER, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF MAKING VENTILATING STRIPS FOR TRANSFORMERS.

Original No. 1,565,532, dated December 15, 1925, Serial No. 555,181, filed April 18, 1922. Application for reissue filed December 7, 1927. Serial No. 238,446.

My invention relates to composite articles, more especially to a method of joining articles of molded composition embodying a heat-hardened binder, such as a phenolic condensation product.

It is among the objects of this invention to provide a bond between two or more of molded articles which shall be mechanically strong and durable and electrically efficient and which shall be of the same general physical characteristics as the articles joined.

Another object of this invention is to provide a method of joining molded articles which shall be simple to practice, which shall be inexpensive and which shall be adapted to produce uniform results in quantity manufacture.

Heretofore, it has been customary to join composite articles comprising fibrous material and a heat-hardened binder by inserting such molded members in a suitable mold of the same contour and shape as the articles to be joined, roughening their surfaces where it is desired to effect a bond, coating said surfaces with a liquid binder having the characteristic of hardening under heat and pressure, such as a phenolic condensation product, inserting the mold between a pair of heated platens of a hydraulic press and applying heat and pressure thereto to form an integral structure.

My invention is an improvement over this process in that my method does not require the use of a mold which has been considered as necessary to prevent blistering and distortion of the surface layers. I have found that, by employing relatively low temperatures, as compared with the temperatures used in standard practice, I am able to effect a bond between two or more molded members without causing distortion or blistering thereof.

In the accompanying drawing constituting a part hereof and in which like reference characters designate like parts, Figure 1 is an exploded view of two layers of molded sheet material;

Where it is desired to join a plurality of molded plates 1 and 2 comprising a plurality of layers of fibrous sheet material consolidated by a heat-hardened binder, I roughen the surfaces 3 by means of sandpaper or by any other suitable means, apply a coating of a solution of a phenolic condensation product thereto, join the two pieces with their coated surfaces in engagement and insert them between a pair of heated platens of a hydraulic press. A temperature of approximately 125° C. and a pressure of approximately one-half ton per square inch of engaging surface are applied thereto for a sufficient length of time to permit the binder to cure, the article being then cooled in the press and removed.

Figure 1:
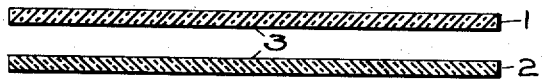
Figure 2:
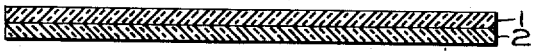
Fig. 2 is a side elevational view showing the layers of Fig. 1 joined in accordance with this invention.
Figure 3:
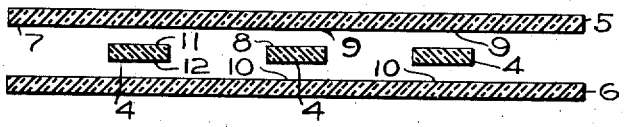
Fig. 3 is an exploded view showing a pair of sheets of molded material and a plurality of strips of like material.
Figure 4:
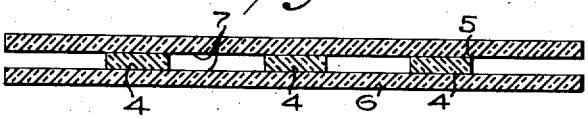
Fig. 4 is a side elevational view showing the strips and sheets of Fig. 3 joined by molding.

This much of the process differs from the method heretofore employed in that a lower temperature is utilized which produces a more efficient bond or joint, and where it is desired to join a plurality of strips 4 and layers 5 and 6 (Fig. 3), my process will prevent those parts 7 and 8 of the surfaces of the plates and strips, respectively, which are not in contact with the pressure platens, from becoming blistered or distorted, which would result by the use of the higher temperatures heretofore employed.

In joining the layers 5 and 6 to the strips 4, I roughen the surfaces 9 and 10 of the layers and the engaging surfaces 11 and 12 of the strips. I then coat these surfaces with layers of phenolic condensation product varnish, join them together and insert them between a pair of molding platens. Heat and pressure are applied within the limits enumerated above to consolidate the assembled members and form an integral structure.

I have found that, by employing a strip of fibrous sheet material impregnated with a phenolic condensation product between the members to be joined, instead of the varnish, a mechanically stronger joint can be produced but this is not essential excepting where strength is the main factor. The process of molding is the same as that employed for the varnish, and the resulting product is equivalent in strength and physical characteristics to one formed of a molded composition or laminated material. It will be noted that the layers to be joined may be coated with the binder in several ways. The binder may be applied as a varnish and the solvent removed; or a sheet of material may be impregnated with a solution of the binder and the solvent removed, and the impregnated sheet may be then applied as a coating between the layers to be joined; or solid binder or compositions including the same may be placed therebetween to provide the coating.

Figure 5:
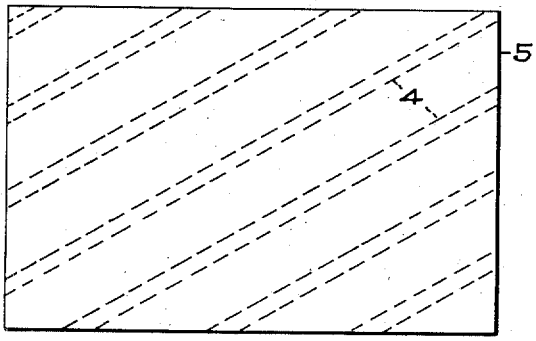
Fig. 5 is a top plan view of a similar structure having diagonally disposed strips.
Figure 6:
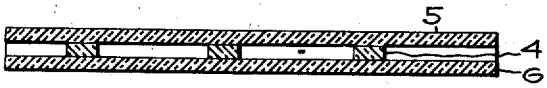
Fig. 6 is a side elevational view thereof.

Figs. 5 and 6 illustrate an article formed in the above specified manner which is cut into strips and commonly employed as ventilating strips in transformer construction. It is obvious that a structure of this type can not be manufactured in a practical and economical manner excepting by the method herein described, as, by the old process, it would be essential to insert metal strips between the molded strips while molding them together to prevent blistering and distortion of the material, whereas, by my process, this is entirely avoided.

It will be readily understood from the above description of my invention that my method provides a simple means for joining a plurality of molded strips or bodies without the aid of molds, retainers and the like, and that my process is adapted to the forming of structural shapes or composite material which have hitherto been impractical. There are many applications in which this process may be successfully employed, such as the forming of ventilating strips and general insulating materials having a structural body shape to provide the requisite strength and surface contour.

Although I have described a specific embodiment of my invention, it will be obvious to those skilled in that art that various modifications may be made in the details of my process without departing from the principles herein set forth. For instance, my method is adapted to join sheets and strips of fiber, wood and similar materials, and the binder may be of any suitable type, such as casein, blood glue, or the like. This process is also adapted to join articles of various shapes and contours and is not limited to flat-surface materials, as illustrated in the drawings.

I claim as my invention:

1. A method of joining molded articles which comprises roughening the surfaces to be joined, placing on said roughened surfaces a binder which is adapted to harden under the influence of heat and pressure, inserting said articles in a press with their treated surfaces in engagement and applying heat and pressure thereto to form an integral structure.

2. A method of joining molded articles which comprises roughening the surfaces to be joined, placing on said roughened surfaces a phenolic condensation product, inserting said articles in a press with their treated surfaces in engagement and applying heat and pressure thereto to form an integral structure.

3. A method of joining molded articles which comprises roughening the surfaces to be joined, placing on said roughened surfaces a phenolic condensation product, inserting said articles in a press with their treated surfaces in engagement and applying a relatively low temperature and a high pressure thereto.

4. A method of joining molded articles which comprises roughening the surfaces to be joined, placing on said roughened surfaces a phenolic condensation product, inserting said articles in a press with their treated surfaces in engagement and applying a temperature below 125° C. and a relatively high pressure thereto.

5. A method of joining molded articles which comprises roughening the surfaces to be joined, placing on said roughened surfaces a phenolic condensation product, inserting said articles in a press with their treated surfaces in engagement and applying a temperature ranging between 100° and 125° C. thereto.

6. A method of joining molded articles which comprises roughening the surfaces to be joined, placing on said roughened surfaces a phenolic condensation product, inserting said articles in a press with their treated surfaces in engagement and applying a temperature ranging between 100° and 125° C. and a pressure of approximately one-half ton per square inch of molding surface thereto.

7. A method of joining molded articles which comprises roughening the surfaces to be joined, interposing a layer of fibrous sheet material impregnated with a binder between said roughened surfaces, inserting said articles in a press and applying a relatively low temperature and a high pressure thereto to form an integral structure.

8. A method of joining molded articles which comprises roughening the surfaces to be joined, interposing a layer of fibrous sheet material impregnated with a phenolic condensation product between said roughened surfaces, inserting said articles in a press and applying a relatively low temperature and a high pressure thereto to form an integral structure.

9. A method of joining molded articles which comprises roughening the surfaces to be joined, interposing a layer of fibrous sheet material impregnated with a binder between said roughened surfaces, inserting said articles in a press and applying a temperature below 125° C. and a relatively high pressure thereto to form an integral structure.

10. A method of joining molded articles which comprises roughening the surfaces to be joined, interposing a layer of fibrous sheet material impregnated with a binder between said roughened surfaces, inserting said articles in a press and applying a temperature ranging between 100° and 125° C. thereto to form an integral structure.

11. A method of joining molded articles which comprises roughening the surfaces to be joined, interposing a layer of fibrous sheet material impregnated with a binder between said roughened surfaces, inserting said articles in a press and applying a temperature ranging between 100° and 125° C. and a pressure of approximately one-half ton per square inch of molding surfaces thereto to form an integral structure.

12. A method of joining a plurality of articles of fibrous material consolidated by a heat-hardened binder which comprises roughening the surfaces to be joined, interposing a layer of fibrous sheet material impregnated with a binder between said roughened surfaces, inserting said articles in a press and applying a relatively low temperature and a high pressure thereto to form an integral structure.

13. A method of joining a plurality of articles of fibrous sheet material consolidated by a heat-hardened binder which comprises roughening the surfaces to be joined, interposing a layer of fibrous sheet material impregnated with a binder between said roughened surfaces, inserting said articles in a press and applying a temperature below 125° C. and a relatively high pressure thereto to form an integral structure.

14. A method of joining a plurality of articles of fibrous sheet material and a phenolic condensation product which comprises roughening the surfaces to be joined, interposing a layer of fibrous sheet material impregnated with a binder between said roughened surfaces, inserting said articles in a press and applying a temperature below 125° C. and a relatively high pressure thereto to form an integral structure.

15. In the art of joining a plurality of strip-like members to a sheet-like member, the method which comprises disposing said strip-like members in spaced relation along said sheet-like member with adhesive material between adjacent surfaces thereof, and applying pressure to and elevating the temperature of said members while maintaining open spaces between said strip-like members.

16. In the art of joining a plurality of strip-like members to a sheet-like member, the method which comprises disposing said strip-like members in spaced relation along said sheet-like member with binder-impregnated sheet material between adjacent surfaces thereof, and applying pressure to and elevating the temperature of said members.

FRANK H. TUPPER.